United States Patent [19]
Jones

[11] Patent Number: 5,863,472
[45] Date of Patent: Jan. 26, 1999

[54] AIR-DIFFUSION APPARATUS

[76] Inventor: Warren H. Jones, 5360 W. Lake Rd., Cazenovia, N.Y. 13035

[21] Appl. No.: 910,295

[22] Filed: Aug. 13, 1997

Related U.S. Application Data

[62] Division of Ser. No. 515,514, Aug. 15, 1995, abandoned.

[51] Int. Cl.⁶ ........................................................ B01F 3/04
[52] U.S. Cl. ......................................... 261/124; 361/121.1
[58] Field of Search .................................. 261/64.2, 72.1, 261/121.2, 124, 77, 121.1, 121.4

[56] References Cited

U.S. PATENT DOCUMENTS

| | | | |
|---|---|---|---|
| 2,212,841 | 8/1940 | Maxwell | 261/124 |
| 2,848,111 | 8/1958 | Gare | 261/124 |
| 3,081,239 | 3/1963 | Clauss et al. | 261/124 |
| 3,160,685 | 12/1964 | Chase | 261/124 |
| 3,679,187 | 7/1972 | Smith . | |
| 3,880,965 | 4/1975 | Dudis et al. | 261/124 |
| 3,886,074 | 5/1975 | Prosser . | |
| 3,911,068 | 10/1975 | Hamilton | 261/124 |
| 3,926,810 | 12/1975 | Gudernatsch et al. | 261/124 |
| 4,181,614 | 1/1980 | Steanhorst | 261/124 |
| 4,863,644 | 9/1989 | Harrington . | |
| 4,960,546 | 10/1990 | Tharp | 261/124 |
| 5,374,353 | 12/1994 | Murphy . | |

OTHER PUBLICATIONS

Envirex, "Autotrol Wastewater Treatment Systems", 1981.
Envirex, "Aero–Surf—Bio–Surf", 1987.

*Primary Examiner*—Robert Davis
*Attorney, Agent, or Firm*—Wall Marjama Bilinski & Burr

[57] ABSTRACT

An air diffusion apparatus for aeration of rotating biological contactors or other media in a liquid filled tank includes an air supply manifold, a drop pipe connected to the air supply manifold, and a diffuser header assembly connected to the drop pipe. The diffuser header assembly has shoes allowing it to roll or slide against the tank walls and bottom during installation and removal. The diffuser header assembly is negatively buoyant during installation and operation of the apparatus, so that attachment of the diffuser header to the bottom or sides of the tank is not required. This results in easy installation and removal of the apparatus without requiring prior removal of the contactor or other obstructions from the tank.

11 Claims, 7 Drawing Sheets

AIR-DIFFUSION APPARATUS

This application is a division of application Ser. No. 08/515,514 filed on Aug. 15, 1995 which application is now abandoned.

FIELD OF THE INVENTION

This invention relates generally to air diffusion systems, and specifically to an air diffusion system for use in new or existing tanks that can hold liquid, especially tanks containing rotating (or non-rotating) biological contactors or variants thereof, or tanks containing other components that obstruct the interior of the tank.

BACKGROUND AND SUMMARY OF THE INVENTION

There are many applications that require air to be diffused throughout large containers of liquid, typically water. An example of such an application is the aeration of contactors, which are most often used in processing, cleaning, purifying, or otherwise treating wastewater. Applicant's invention may be used for general aeration services but is particularly well suited for aerating contactors.

Aeration, effecting intimate contact between air and liquid, is widely used for the purpose of dissolving oxygen to support aerobic organisms employed in wastewater treatment and agitation or mixing to suspend and prevent sedimentation of solids. Some popular models of contactors are "air driven" devices wherein the air moving through the media drives the contactors, thus eliminating the need for mechanical gear and motor drives.

An air diffusion apparatus incorporating applicant's invention accomplishes the oxygen dissolving function by diffusing low pressure air into wastewater through orifices in a perforated pipe or specialized diffuser nozzles in a diffuser header, so that small bubbles are discharged uniformly into and rise continuously through the wastewater.

There are many reasons why an efficient method of aerating contactors is needed. Added transfer of oxygen into the wastewater increases system treatment capacity and efficiency by creating an environment favoring beneficial biota and reduced nuisance growth. Certain advanced and combined treatment processes with contactors require aeration for successful operation. A thinner biomass is achieved and maintained through increased agitation as the air bubbles rise through the contactor media. Thinner biomass reduces structural loads on the contactor and contactor support shaft, and reduces hydraulic drag as the contactor rotates in the wastewater, thus potentially reducing energy consumption and permitting closer spacing of the contactor media with less risk of mechanical overloading from excessive biofilm growth. Increased concentrations of wastewater can therefore be applied to aerated contactors. Tests have demonstrated up to 50% greater loadings and removal efficiencies. Aeration in the lower portion of the contactor tank assists in keeping solids in suspension. These and other reasons make desirable an efficient aeration method.

There are numerous designs and configurations for submerged diffused aeration devices. However, when there is a contactor or other obstruction in the tank, positioning the aeration device correctly in the tank can be difficult. Additionally, because the devices carry air through a heavier liquid, buoyancy can be a problem. There are designs that embrace ballast or weights to prevent flotation, but no known prior art device combines weight to prevent flotation with rolling or sliding shoes for positioning, support, and mobility of aeration headers.

Prior art contactor aeration devices are typically attached mechanically to the bottom of a contactor tank and to the to of the tank walls. Traditional methods of support and anchoring such devices require fixed support, hooks, or brackets, all mounted with anchor bolts to the tank floor or walls. These methods require installation before the contactor is put in lace, making the aeration device difficult to remove for service and almost impossible to relocate if adjustment of position is indicated.

Accordingly, one object of applicant's invention is to make possible an aeration system that allows convenient installation and removal of an air diffusion system apparatus in new or existing tanks containing contactors or variants thereof, or containing other obstructions.

Another object of this invention is to prevent flotation of the pipes and diffuser header assemblies without using fixed support, hooks, or brackets mounted to the tank floor or walls, by making diffuser header assemblies that are negatively buoyant when installed and while in use.

Applicant's invention solves these and other problems by providing structure that uses novel means for supporting and locating the apparatus on the tank floor, and preventing flotation with added weight, preferably by a plurality of weighted shoes.

An air diffusion apparatus comprising applicant's invention features an air supply manifold, one or more "drop pipes" (with or without air control valves) connected to the air supply manifold, and one or more negatively buoyant diffuser header assemblies connected to respective drop pipes and preferably containing one or more shoes. Each diffuser header assembly provides one or more diffuser orifices comprising nozzles or holes.

The shoes are preferably weighted, can slide or rotate along tank surfaces, and are preferably located on the diffuser header, which is essentially a pipe through which air can flow toward an end cap. The end cap can host an additional diffuser orifice outboard of the shoe, and acts as a "bumper" should it contact a tank wall or the like during installation. Air control valves on individual drop legs, and coarse bubble diffusers, may be furnished as an option for flexibility in air control.

The drop pipes are carefully designed and configured depending on the shape and configuration of the tank and obstruction, in order to allow easy installation and removal of the diffuser headers without interference with the contactor or tank wall. The drop pipes deliver air to the diffuser headers, which distribute air along the tank through the diffuser orifices.

Submerged air diffuser devices, depending upon the size and weight of piping, tend to be buoyant when the tank is filled with liquid and the pipe is filled with air. This problem is overcome in the referred embodiments of applicant's invention by using weighted shoes to locate the diffuser header at the desired elevation for best operation while allowing clearance underneath a contactor or other obstruction, and providing sufficient weight to prevent flotation of the aeration equipment. Other embodiments can be made with the weight or weights placed at other locations about the diffuser header, but it is referred to use weighted shoes, so that the shoes themselves comprise sufficient weight or have weights attached or placed adjacent to them. When the air diffusion apparatus is being installed in or removed from a tank, the weighted shoes keep the apparatus from floating, while allowing mobility by rolling or sliding along the tank bottom or inclined walls. This minimizes the force necessary to lift and move the device, while preventing unnecessary strain on piping and joints associated with less freely rolling or sliding devices.

Shoe is used herein to mean any structure (wheels, rollers, runners, bearings, etc.) for supporting a device while allowing it to safely and conveniently roll or slide against the side or bottom of a tank. Weighted shoe (weighted runner, weighted roller, etc.) is used herein to mean either a shoe (runner, roller, etc.) that is itself heavy or weighted, or a shoe (runner, roller, etc.) placed in close proximity to a weight or weights. Pipe sections may be plastic, steel, stainless steel, other metals, or any other suitable materials, fabricated with screwed fittings, solvent welded fittings, welded metal fittings, adapters or sections formed by bending or rolling, or by any other suitable means. Connections may be flanged, screwed, unions, mechanical joints, or any other suitable type.

One advantage of applicant's invention is adjustability. The diffuser header can be accurately positioned or relocated within the tank by adjustments made above the tank walls, using the drop pipe as a tongue or handle.

Another advantage of the invention is that, as mentioned previously, it provides for use of a hollow shaft or pipe as a support for the shoes. This feature allows one or more aeration ports or diffuser orifices to be mounted outboard of the shoes, thereby providing greater aeration width and eliminating dead spaces at the end of the diffuser header. This feature also helps avoid interference with tank walls and damage to diffuser assemblies.

A further advantage of the invention is improved convenience of installation and (when necessary) removal of the diffuser header, saving substantial time and cost in construction or retrofit of such systems. In systems that require a fixed floor-mounted submerged bracket, the upper piping must be adjusted to comply with that inaccessible bracket. But with the rolling or sliding shoe feature of the invention, normally only the piping above the tank needs to be adjusted when installing.

Advantages of applicant's air diffusion apparatus include convenience and ease of installation in new or existing tanks. Applicant's air diffusion apparatus can be installed with tanks full of wastewater and contactors in place, immediately providing the advantages of contactor aeration. The weighted shoes allow easy installation and adjustment of applicant's air diffusion apparatus, and anchoring and control is all conveniently located above the wastewater surface.

BRIEF DESCRIPTION OF THE DRAWING

For a fuller understanding of the nature and objects of the invention, reference should be made to the following detailed description of a referred mode of practicing the invention, read in connection with the accompanying drawing illustrating some embodiments of the invention, in which.

DETAILED DESCRIPTION OF THE DRAWING

Figure 5:
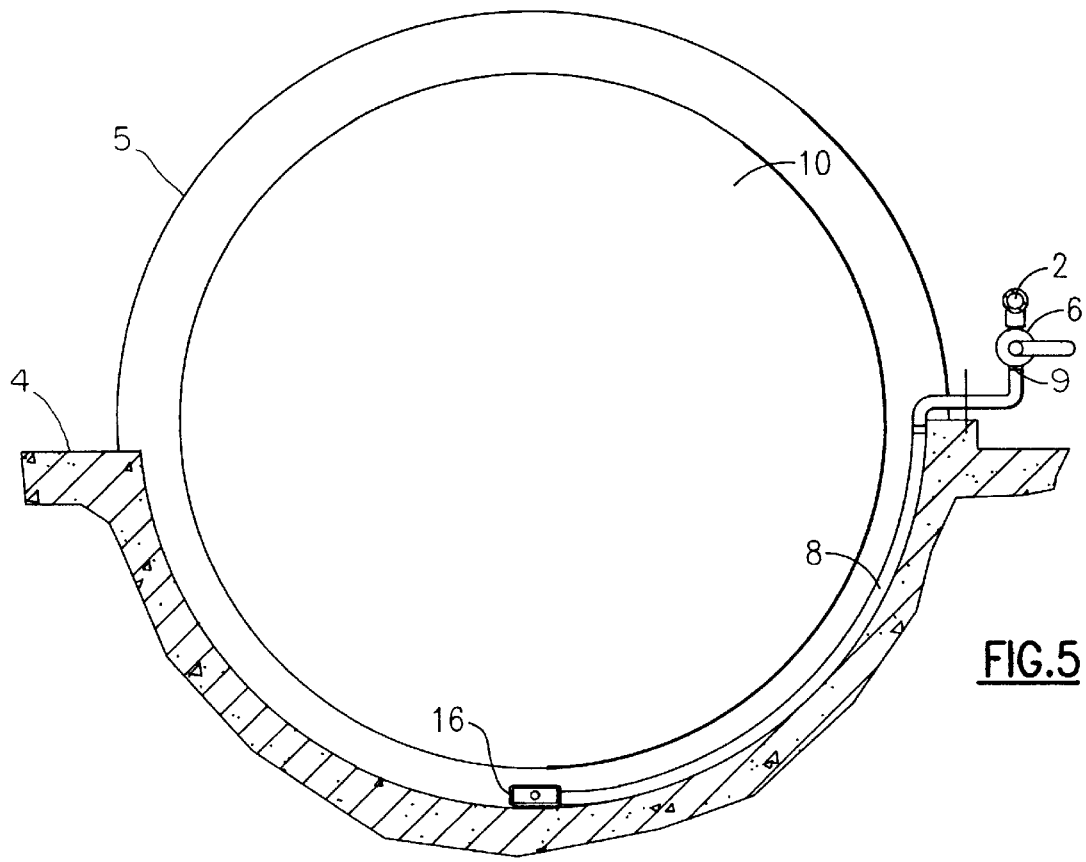
FIG. 5 is a side view according to the first embodiment of the invention as used in a first type of liquid containing tank, with a cross sectional of the tank and accompanying contactor.
Figure 6:
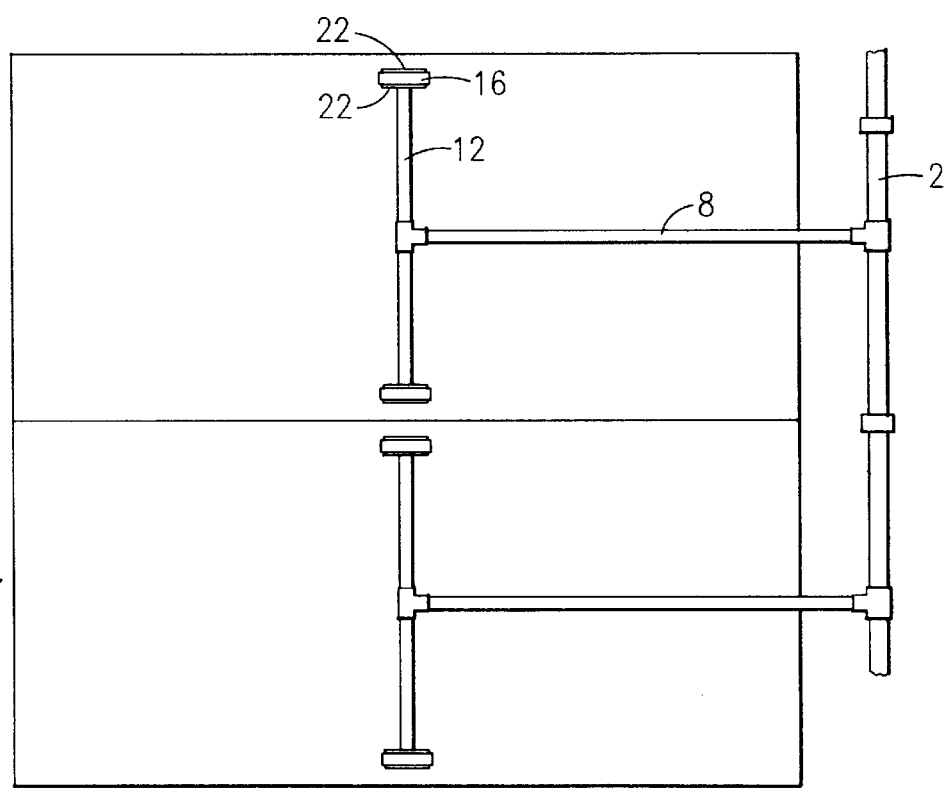
FIG. 6 is a to view according to the first embodiment of the invention as used in one or two liquid containing tanks, showing two diffuser header assemblies with drop pipes using the same air supply manifold.
Figure 7:
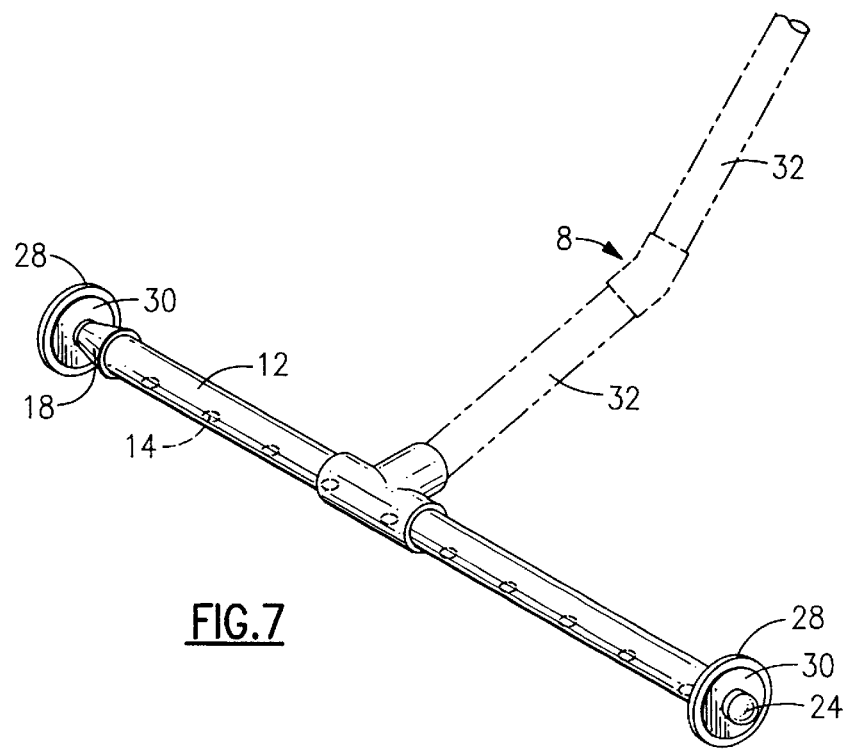
FIG. 7 is a perspective view of a diffuser header assembly according to a second embodiment of the invention.
Figure 8:
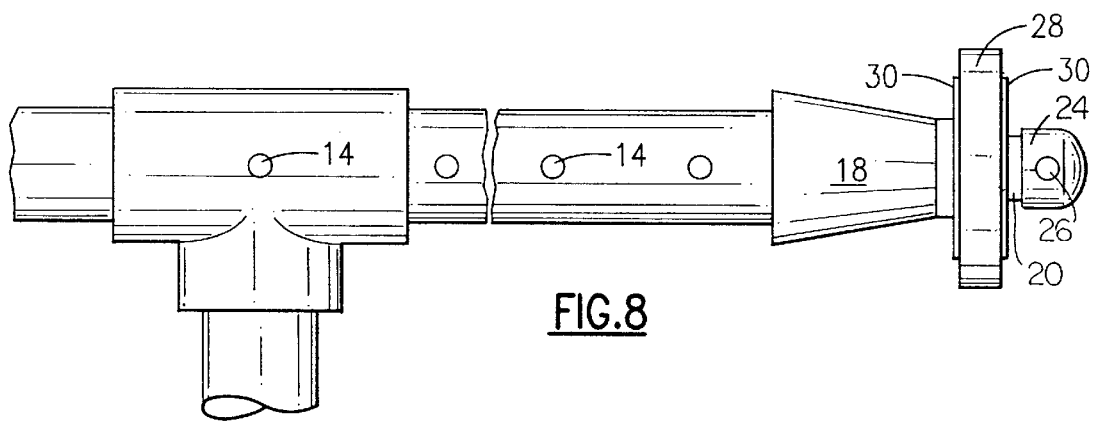
FIG. 8 is a bottom view of portions of the diffuser header assembly according to the second embodiment of the invention, including the shoe area.
Figure 9:
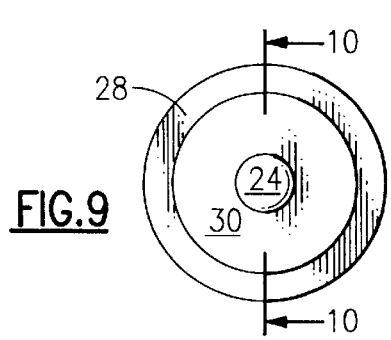
FIG. 9 is a side view of the shoe assembly according to the second embodiment of the invention.
Figure 10:
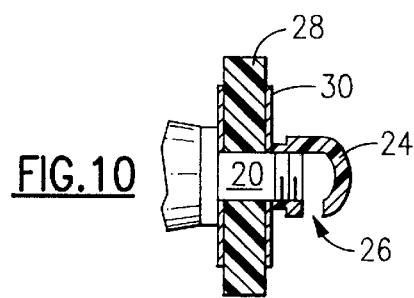
FIG. 10 is a front view partial cross sectional of the shoe assembly according to the second embodiment of the invention.

FIGS. 5 and 6 illustrate how applicant's invention can be used with a wastewater tank containing a number of spaced apart contactors. FIG. 6 shows a to view of two tanks, or two sections of a single tank, with applicant's invention being used for air diffusion in both tanks or sections. The contactors or other obstructions are not shown in FIG. 6. FIG. 5 is a side view of the configuration shown in FIG. 6, but showing the typical relative position of the contactors as well. An air supply manifold 2 is shown positioned alongside tank or tanks 4. A possible tank cover 5 is also shown. A number of drop pipes 8 can be attached to the air supply manifold 2 via a union or quick connect coupling 9. An air control valve 6 supplies pressurized air from the air supply manifold 2 to a respective drop pipe 8. Each drop pipe 8 extends under the contactor 10 or other obstruction, and connects with a diffuser header 12. Runners (sliding shoes) 16 support each diffuser header 12. Where the tank 4 is cylindrical, as in FIG. 5, a drop pipe 8 can be fashioned to match, so that the diffuser header 12 can be easily slid into position beneath the contactor 10, supported on the runners 16.

Figure 1:
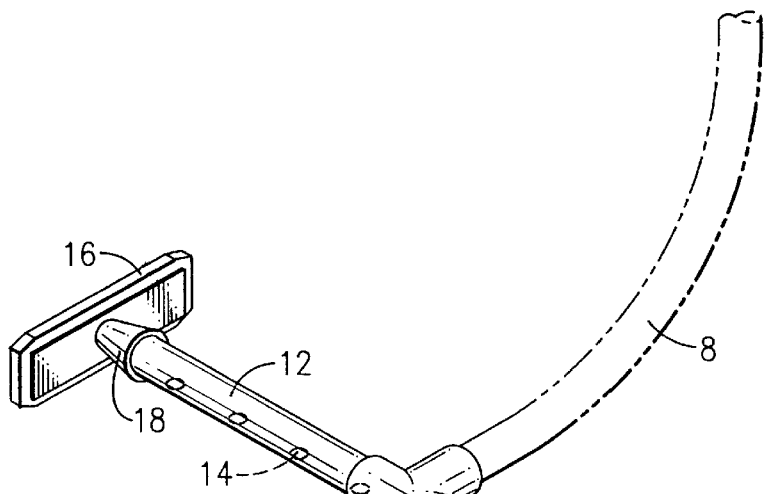
FIG. 1 is a perspective view of a diffuser header assembly according to a first embodiment of the invention.
Figure 2:
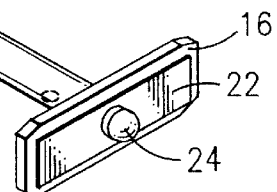
FIG. 2 is a bottom view of proportions of the diffuser header assembly according to the first embodiment of the invention, including the shoe area.
Figure 2:
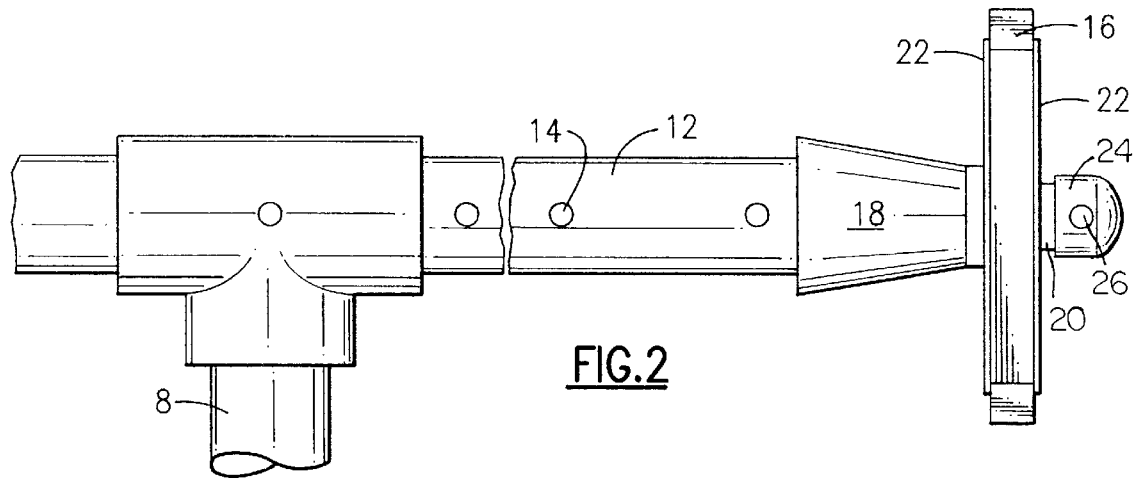
Figure 3:
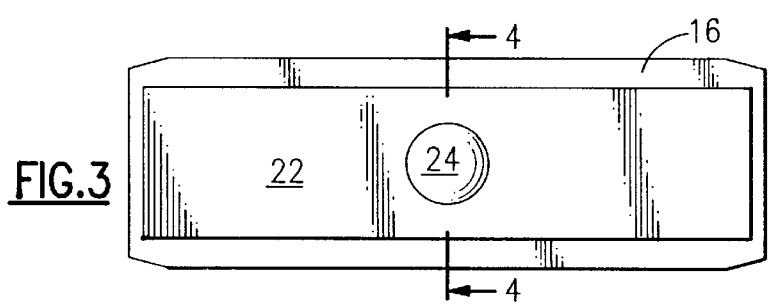
FIG. 3 is a side view of the shoe assembly according to the first embodiment of the invention.
Figure 4:
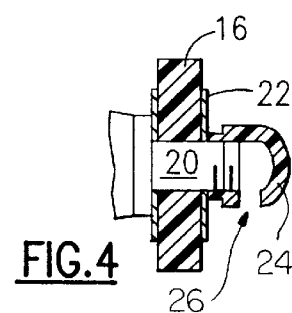
FIG. 4 is a front view partial cross sectional of the shoe assembly according to the first embodiment of the invention.

FIG. 1 shows a closer, perspective view of a diffuser header 12 assembly. Drop pipe 8 delivers air to the diffuser header 12. Diffuser orifices 14 in this embodiment are holes spaced along the bottom length of the diffuser header 12. In other possible embodiments the diffuser orifices may be either holes or specialized diffuser nozzles, and may be spaced along the bottom, to, or sides of the diffuser header. A runner (sliding shoe) 16 is positioned at either end of the diffuser header 12. Runner 16 may be weighted, and additional weights can be placed with it. In this embodiment, illustrated in greater detain in FIGS. 2–4, reducing couplers 18 connect either side of the diffuser header 12 with respective pipes 20 that extend through respective runners 16 and runner weights 22. An end cap 24 screws on (as in the embodiment shown) or is otherwise attached to each pipe 20 to hold its respective runner 16 and runner weights 22 in place. One or more orifices 26 on each end cap 24 function as additional diffuser orifices.

Low pressure air is generally supplied to the air supply manifold 2 from blowers and a plant air system or blower (not shown) dedicated to the aeration system. The pressurized air flows from the air supply manifold 2, through the drop pipe 8, into the diffuser header 12 and pipe 20, and is discharged uniformly from the diffuser orifices 14 and outboard orifices 26 to aerate the liquid in the tank 4, the contactors 10, and the contactor media. Each diffuser header 12 can be easily removed from and reinstalled to its proper position in the tank 4 by making its respective drop pipe 8 disconnectable from the air supply manifold 2 at the union or quick connect coupling 9 above the water line. All drop pipes 8 and diffuser headers 12 could even be removed at one time by removing the entire air supply manifold 2.

FIGS. 7–12 illustrate a second embodiment of the invention used with a second type of tank. In the second embodiment the diffuser header 12 functions similarly as in the first embodiment, but is supported by rollers (rolling shoes) 28 and roller weights 30 instead of runners 16 and runner weights 22. Roller 28 may be weighted, and the additional weights can be placed with it. Shoe weights 22, 30, can be of any suitable shape, so long as they do not interfere with the function of shoes 16, 28. In one embodiment, standard barbell type weights or rollers are used, with a circular weight of one size acting as roller 28 and smaller circular weights (if needed) acting as roller weights 30. Pipes 20 act as shafts or trunnions for rollers 28 and convey air to end caps 24 and end cap diffuser orifices 26.

Figure 11:
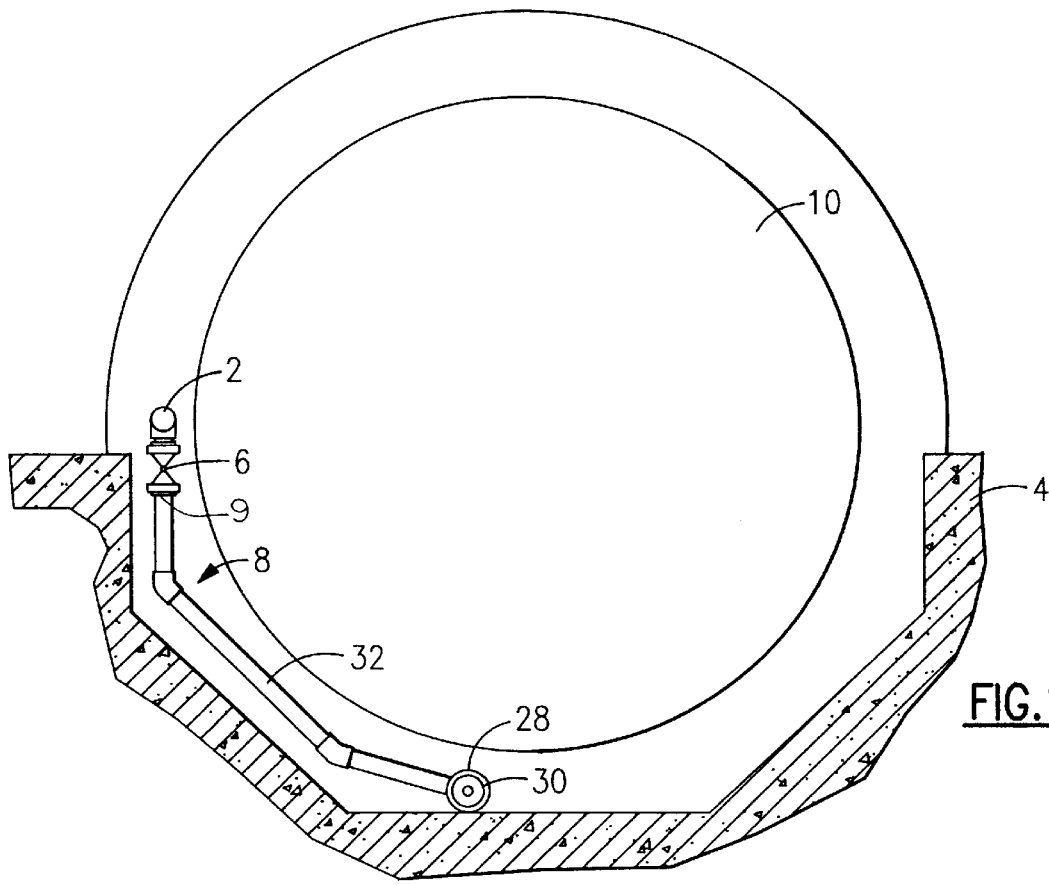
FIG. 11 is a side view according to the second embodiment of the invention as used in a second type of liquid containing tank, with a cross sectional of the tank and accompanying contactor.
Figure 12:
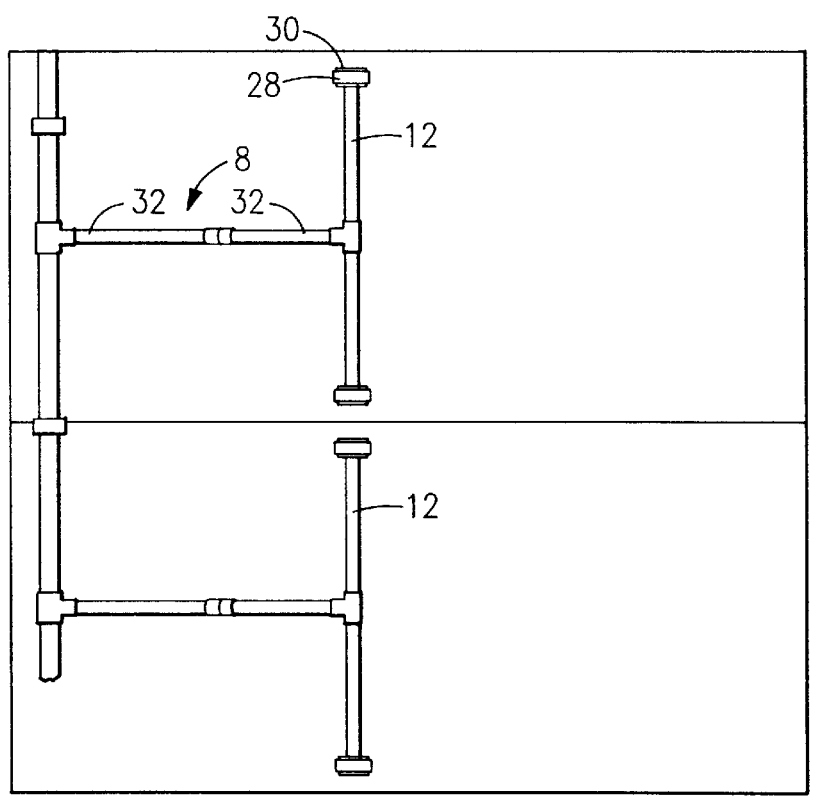
FIG. 12 is a to view according to the second embodiment of the invention as used in single or multiple compartments of liquid containing tanks, showing a plurality of diffuser header assemblies with drop pipes using the same air supply manifold.
Figure 13:
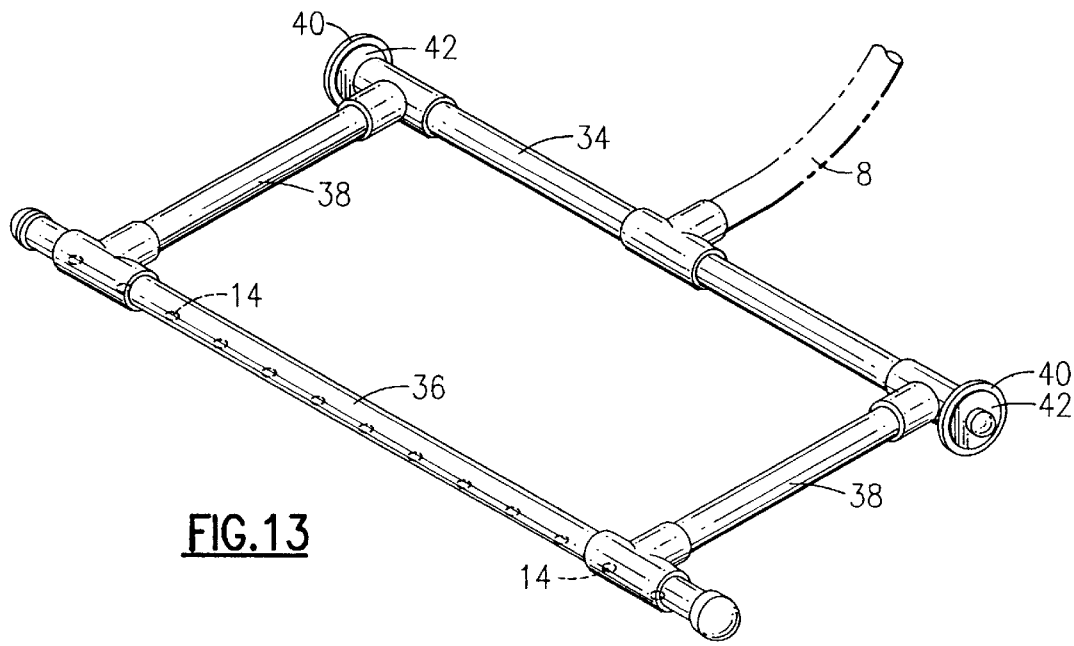
FIG. 13 is a perspective view of a diffuser header assembly according to a third embodiment of the invention.

FIG. 11 illustrates how each drop pipe 8 may comprise a number of pipe sections 32 in order that the shape of drop pipe 8 may match the particular tank and obstruction configuration, so that the combination of the drop pipe and diffuser header can be slid or rolled easily into place.

FIGS. 13–17 illustrate a third embodiment of the diffuser header assembly. In this embodiment the diffuser header comprises a support header. 34, an extension header 36, and header connectors 38 connecting the support header 34 to the extension header 36. In this embodiment, shoes 40 and shoe weights 42, which may be of either sliding or rolling type (rolling shoes are shown, but either type may be used) are attached to the ends of the support header 34, and the extension header 36 is supported above the tank floor by the header connectors 38, as illustrated. The header connectors 38 tilt upward about 45° from the line of the drop pipe 8 in the embodiment shown, so that the header connectors 38 are preferably positioned horizontally for use. This angle can be adjusted according to the requirements of the particular configuration of tank and contactor or other obstruction. The header connectors 38 deliver air to the extension header 36, which distributes air through diffuser orifices 14.

Figure 18:
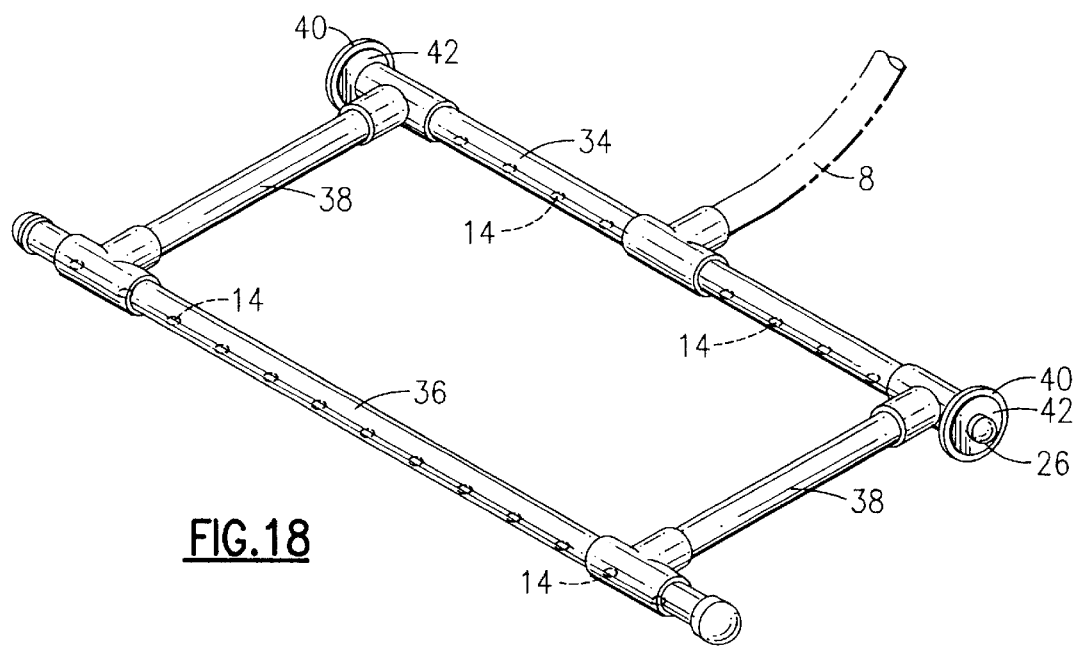
FIG. 18 is a perspective view of a diffuser header assembly according to a fourth embodiment of the invention.
Figure 14:
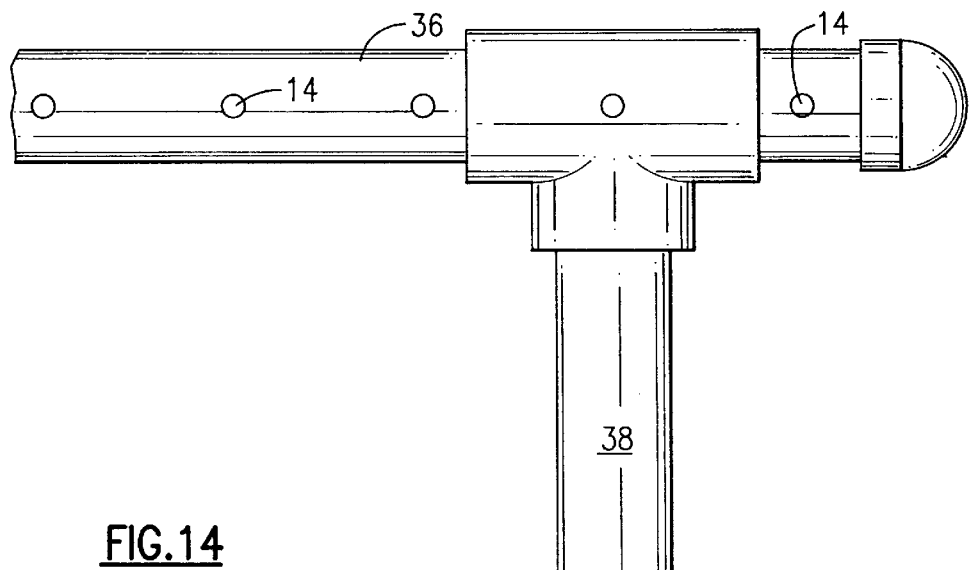
FIG. 14 is a bottom view of portions of the diffuser header assembly according to the third embodiment of the invention, including the shoe area.
Figure 15:
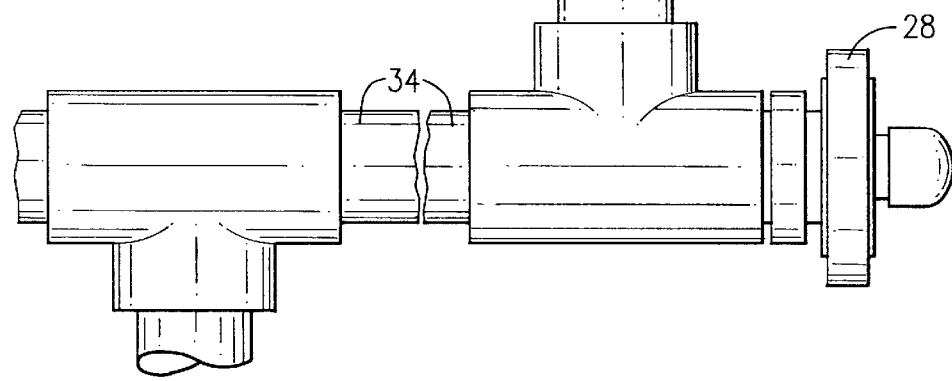
FIG. 15 is a side view of the shoe assembly according to the third embodiment of the invention.
Figure 15:
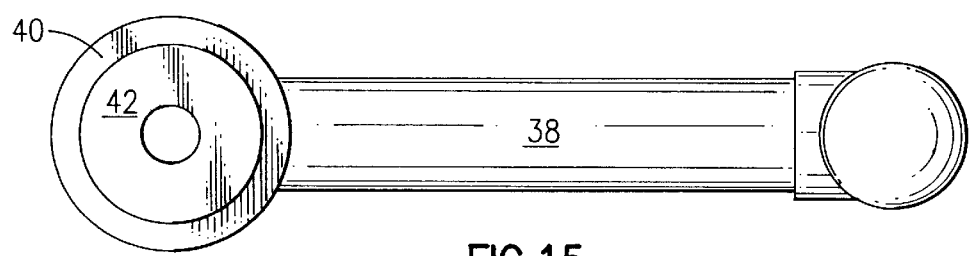
Figure 16:
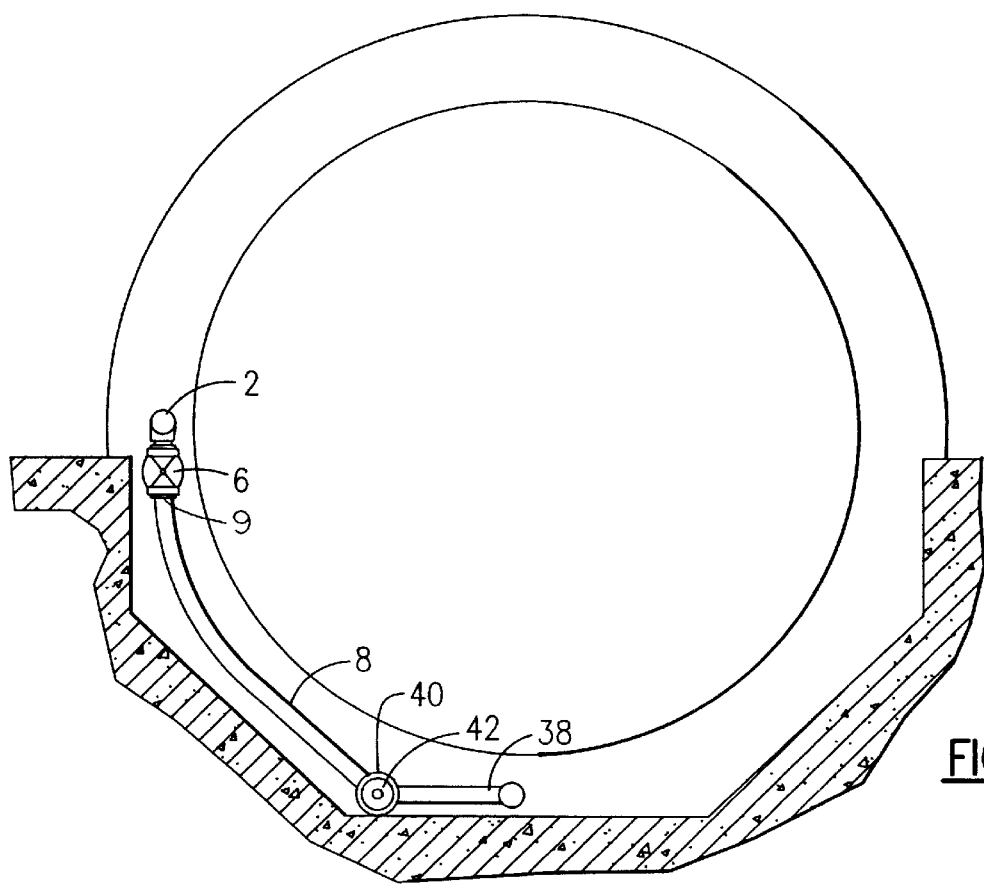
FIG. 16 is a side view according to the third embodiment of the invention as used in the second type of liquid containing tank, with a cross sectional of the tank and accompanying contactor.
Figure 17:
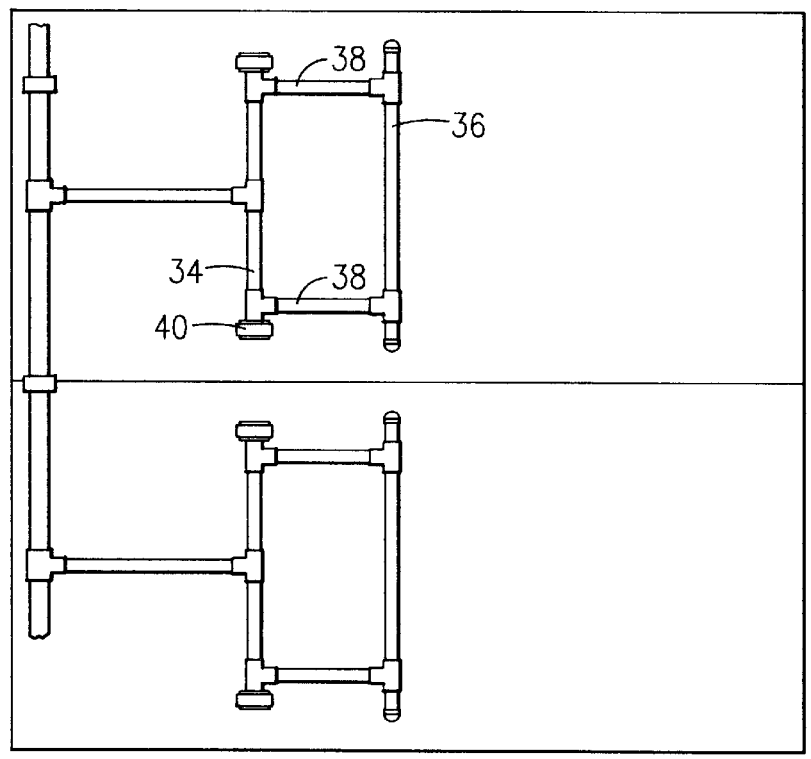
FIG. 17 is a to view according to the third embodiment of the invention as used in single or multiple compartments of liquid containing tanks, showing a plurality of diffuser header assemblies with drop pipes using the same air supply manifold.

FIG. 18 illustrates a fourth embodiment of the diffuser header assembly. This embodiment is similar to the embodiment shown in FIG. 13, but support header 34 also distributes air through diffuser orifices 14 and outboard orifices 26.

The above described drawing illustrates the various embodiments of the claimed invention. It will be understood that many other embodiments of the claimed invention may be fashioned. For example, differently shaped diffuser headers may be used. Different combinations of drop pipe and diffusion header embodiments may also be used. For example, the diffusion header shown in FIG. 1 can be used with the drop pipe configurations and tank type shown in FIGS. 11 and 16, and so forth.

While the present invention has been particularly shown and described with reference to the referred mode as illustrated in the drawing, it will be understood by one skilled in the art that various changes in detail may be effected therein without departing from the spirit and scope of the invention as defined by the claims.

I claim:

1. An aeration device for an air diffusion apparatus, said apparatus including a waste water tank, said tank having an interior volume defined by a bottom wall and a surrounding side wall said apparatus further including at least one rotating biological contactor spaced apart from said side wall and said bottom wall, said aeration device comprising;

an air supply manifold;

a drop pipe connected to said air supply manifold; and a diffuser header assembly connected to said drop pipe, said header assembly being sized to allow said header assembly to pass between said at least one rotating biological contactor and said side wall for insertion into and extraction out of the interior volume of said waste water tank without requiring removal of said at least one biological contactor, said device further having weighted contact means for maintaining said header assembly in contact with said side wall and said bottom wall of said tank during insertion, extraction and use of said aeration device.

2. An air diffusion apparatus as recited in claim 1, wherein said diffuser head assembly includes a diffuser header connected to one end of said drop pipe; and first and second roller means, connected to opposite first and second ends of said diffuser header, for permitting said diffuser header to roll against a side and the bottom of the interior volume of said tank during insertion and extraction of said diffuser header therefrom.

3. An air diffusion apparatus as recited in claim 2, wherein said first and second roller means are weighted to cause said diffuser header to remain in contact with said side and bottom of said interior volume of said tank despite the presence of liquid or other media therein.

4. An air diffusion apparatus as recited in claim 3, wherein each of said first and second weighted roller means includes an end cap with an orifice therein, said orifice fluidly communicating with said diffuser header, said drop pipe, and said air supply manifold.

5. An air diffusion apparatus as recited in claim 1, wherein said diffuser head assembly includes a diffuser header connected to one end of said drop pipe; and first and second slide means, connected to opposing first and second ends of said diffuser header, for permitting said diffuser header to slide against a side and bottom of the interior of said tank during insertion and extraction of said diffuser header therefrom.

6. An air diffusion apparatus as recited in claim 5, wherein said first and second slide means are weighted to cause said diffuser assembly to remain in contact with said side and bottom of the interior volume of said tank despite the presence of liquid or other media therein.

7. An air diffusion apparatus as recited in claim 6, wherein each of said first and second weighted slide means includes an end cap having an orifice therein, said orifice fluidly communicating with said diffuser header, said drop pipe, and said air supply manifold.

8. An air diffusion apparatus as recited in claim 1, wherein said drop pipe is made of variable length to allow the location of said diffuser header assembly to be readily changed relative to a first position at the bottom of said tank.

9. A device as recited in claim 2, wherein said weighted contact means include at least one pair of weighted shoes coaxially attached to said at least one diffuser header, said at least one header serving as an axle therebetween.

10. A device as recited in claim 9, wherein said at least one diffuser header is transversely attached to said drop pipe, said weighted shoes being evenly spaced relative to said drop pipe.

11. A device as recited in claim 10, wherein said at least one diffuser header includes a plurality of diffusing orifices, and in which at least a portion of said diffuser orifices are disposed outwardly relative to said at least one pair of weighted shoes.

* * * * *